United States Patent [19]

Policastro et al.

[11] Patent Number: 4,826,916

[45] Date of Patent: May 2, 1989

[54] SILICONE POLYMIDES, AND METHOD FOR MAKING

[75] Inventors: Peter P. Policastro, Niskayuna; Pamela K. Hernandez, Clifton Park; Jonathan D. Rich, Rexford, all of N.Y.

[73] Assignee: General Electric Company, Schenectady, N.Y.

[21] Appl. No.: 20,263

[22] Filed: Feb. 27, 1987

[51] Int. Cl.[4] .............................................. C08K 5/06
[52] U.S. Cl. ...................................... 524/755; 524/860; 524/375; 528/26; 528/27; 528/28
[58] Field of Search ...................... 528/26, 27, 20, 28; 525/474; 524/375, 755, 860

[56] References Cited

U.S. PATENT DOCUMENTS 3,905,942  9/1975  Takekoshi et al. .................. 528/26
4,181,641  1/1980  Boldebuck ........................... 524/374
4,522,985  6/1985  Ryang .................................. 528/26
4,690,997  9/1987  Cella et al. ........................... 528/26

OTHER PUBLICATIONS

J. R. Pratt et al., Journal of Organic Chemistry, vol. 38, No. 25 (1973), pp. 4271–4274.

*Primary Examiner*—John C. Bleutge
*Assistant Examiner*—R. Dean, Jr.
*Attorney, Agent, or Firm*—William A. Teoli; James C. Davis, Jr.; James Magee, Jr.

[57] ABSTRACT

Polyimidesiloxane coating compositions resulting from the intercondensation in the presence of methylanisole of various dianhydrides such as 2,2-bis[4-(3,4-dicarboxyphenoxy)phenyl]-propane dianhydride or bis(phthalicanhydride)tetramethyldisiloxane, or mixtures thereof with organic diamine such as toluenediamine, aminoalkyl terminated polydimethylsiloxane or oxydianiline.

10 Claims, No Drawings

SILICONE POLYIMIDES, AND METHOD FOR MAKING

BACKGROUND OF THE INVENTION

Prior to the present invention, as shown by Berger U.S. Pat. No. 4,395,527 and Lee U.S. Pat. No. 4,586,997, incorporated herein by reference, silicone polyimides were generally recognized as materials useful as protective coatings for semiconductors and other electronic devices. As discussed by Lee and Berger, silicone polyimides are insoluble in many of the common organic solvents. However, particular siloxane imide copolymers have been found to be soluble in glycol methyl ethers, such as diglyme, or mixtures of diglyme with organic solvents, such as xylene, which can serve as an azeotroping solvent.

Although silicone polyimides made in accordance with the teaching of Lee and Berger have been found useful as protective coatings for a variety of semiconductors, it has been found that the 8000 g/mole molecular weight range of silicone polyimides made in diglyme mixtures often does not provide the thermal stability required in particular microelectronic applications. Silicone polyimides are often needed having a higher molecular weight of at least 30,000 g/mole or more.

One method for increasing silicone polyimide molecular weight to provide higher thermal stability is to form the silicone polyimide in a chlorinated aromatic hydrocarbon solvent, such as orthodichlorobenzene, in the presence of an imidization catalyst, for example, p-N,N-dimethylaminopyridine. It has been found, however, that even though the resulting silicone polyimide has improved thermal stability, its solution viscosity as a result of its higher molecular weight, can be substantially enhanced. For example, the solution viscosity of a silicone-polyimide of 30,000 g/mole at 30% solids in diglyme/xylene can be as high as 8000 centipoise rendering it less useful as a spin castable mixture. In addition, the higher molecular weight silicone polyimide retains residual amounts of the imidization catalyst required in its polymerization, which can further reduce its utility as a coating material in microelectronic applications. Although a somewhat improved viscosity can be achieved by polymerizing and utilizing the silicone polyimide in a chlorinated hydrocarbon solvent, such as orthodichlorobenzene, the utility of such mixture is significantly reduced because of environmental considerations and its potential for corrosion as a result of the presence of chemically combined halogen.

The present invention is based on the discovery that certain silicone polyimides useful as coating materials in microelectronic applications can be made by effecting reaction in the presence of methylanisole, which hereinafter means o-, p-, or m-methylanisole and preferably p-methyanisole between particular aromatic dianhydrides and $C_{(6-14)}$ aryl diamine or a mixture thereof with aminoalkyl terminated polydiorganosiloxane. There can be used aromatic bis(ether anhydride), for example 2,2-bis[4-(3,4-dicarboxyphenoxy)phenyl]propane dianhydride "BPADA", or phthalic anhydride terminated polydiorganosiloxane such as bis(phthalic anhydride)-tetramethyldisiloxane "PADS". These aromatic dianhydrides can be reacted with $C_{(6-14)}$ aryldiamines, such as toluenediamine "TDA", or polydiorganosiloxane having terminal α-aminoalkyl diorganosiloxy units, such as tetramethyldisiloxane having terminal α-aminopropyl dimethylsiloxy units "DGAP", or where the methylsiloxane block has eight chemically combined dimethylsiloxy units, "$D_8GAP$".

Unexpectedly, these silicone polyimides made in the presence of methylanisole, exhibit a thermal stability which is substantially equivalent to the thermal stability shown by silicone polyimide made from the same ingredients and proportions in orthodichlorobenzene in the presence of an imidization catalyst. Further, silicone polyimide made in methylanisole, enjoys a significantly lower solution viscosity when employed at concentrations of 30% or more by weight of solids, as compared to the same silicone polyimide in an ortho-dichlorobenzene or diglyme media.

STATEMENT OF THE INVENTION

There is provided by the present invention, silicone polyimide coating compositions comprising by weight
(A) 100 parts of methylanisole, and
(B) 2 to 150 parts of silicone polyimide selected from
  (1) the intercondensation product of reaction between substantially equal molar amounts of aromatic bis(ether anhydride), and organic diamine selected from the class consisting of $C_{(6-14)}$ aryldiamine, aminoalkyl terminated polydiorganosiloxane, and mixtures thereof, and
  (2) the intercondensation product of reaction between phthalic anhydride terminated polydiorganosiloxane, or a mixture of phthalic anhydride terminated polydiorganosiloxane and organic dianhydride, and $C_{(6-14)}$ aryldiamine.

Among the dianhydrides which can be utilized in the practice of the present invention, there are included, aromatic bis(ether anhydride) of the formula, $$\text{(1)}$$

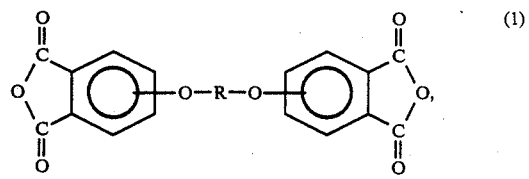

where R is a $C_{(6-14)}$ divalent aromatic radical selected from,

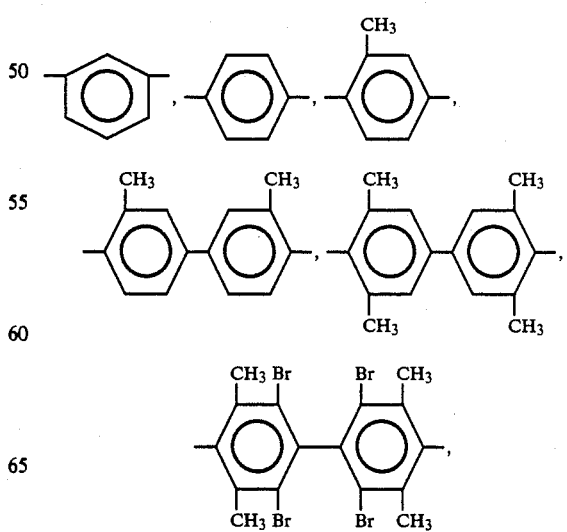

-continued

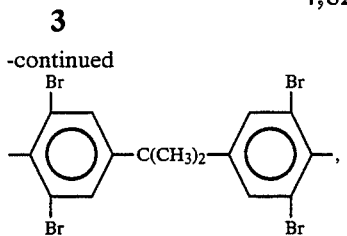

and divalent organic radicals of the general formula,

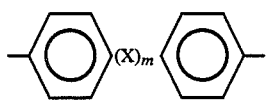

where X is a member selected from the class consisting of divalent radicals of the formulas,

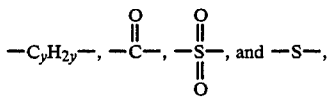

where m is 0 or 1, and y is a whole number equal to from 1 to 5.

In addition to the above aromatic bis(ether anhydride), other dianhydrides which can be used in the practice of the invention are "siloxane dianhydrides" of the formula,

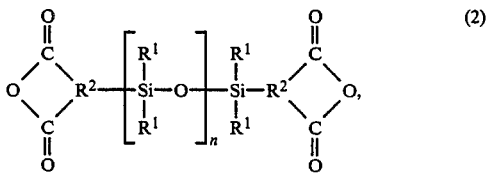

where $R^1$ is a $C_{(1-14)}$ monovalent hydrocarbon radical or a $C_{(1-14)}$ substituted monovalent hydrocarbon radical, $R^2$ is a $C_{(6-14)}$ trivalent organic radical, are preferably phthalic or norbornyl, and is is an integer equal to from 1 to 30 inclusive. Preferably, the siloxane dianhydride of formula (2) is bis-phthalic anhydride tetramethyldisiloxane, where n is 1, referred to hereinafter as "PADS". Siloxane dianhydride of formula (2) can be made by the procedure shown by J. R. Pratt et al., Journal of Organic Chemistry, Vol. 38, No. 25 (1973) pages 4271–4274. Reference to "PADS" also is made in copending application Ser. No. 011,185, filed Feb. 5, 1987, now U.S. Pat. No. 4,795,680, and application Ser. No. 765,089 filed Aug. 13, 1985, now U.S. Pat. No. 4,709,054, assigned to the same assignee as the present invention and incorporated herein by reference.

The preferred aromatic bis(ether anhydride) utilized in the practice of the invention is 2,2-bis[4-(3,4-dicarboxyphenoxy)phenyl]propane dianhydride "BPADA". Other organic dianhydrides which can be used are, for example, 5,5'-(1,1,3,3-tetramethyl-1,3-disiloxanebisnorbornane-2,3-dicarboxylic anhydride "DiSiAN", shown by Ryang U.S. Pat. No. 4,381,396, oxy-bis(4-phthalic anhydride) "ODAN". As used hereinafter, the term "organic dianhydride" can include BPADA, DiSiAN, or ODAN, or a mixture thereof which can be used in combination with PADS at up to an equal molar amount. In addition, organic dianhydride also can include up to 10 mol percent, based on total moles of anhydride of pyromellitic anhydride "PMDA", benzophenone dianhydride "BPDA", and 3,3',4,4'-biphenyltetracarboxylic acid anhydride.

The preferred silicone polyimides of the present invention can be made by condensing BPADA, PADS or a mixture of PADS and organic dianhydride with amino-organo-terminated organosiloxane which can be used in further combination with organic diamine. Some of the amino-organo-terminated siloxane which can be used in the practice of the invention are shown by Lee U.S. Pat. No. 4,586,997. Preferably, there can be used amino-terminated siloxane of the formula

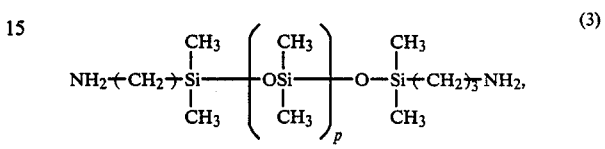

where p has a value of 0–8 inclusive, which includes DGAP, where p is equal to 1, and D8GAP where p is equal to 8. In addition to the amino-terminated siloxane of formula (3), there is also included in the practice of the present invention, the use of various organic diamines or mixtures thereof, as previously defined, alone, or in combination with the amino-terminated siloxane of formula (3). In addition to the amino-terminated siloxane of formula (3), there also can be utilized polydimethylsiloxane having from 0 to about 8 chemically combined dimethylsiloxy units having terminal aminophenyl units attached to silicon by carbon-silicon bonds.

The following examples are given by way of illustration and not by way of limitation. All parts are by weight.

EXAMPLE 1

A mixture of 43 grams (0.172 mole) of 1,3-bis(3-amino-N-propyl)-1,1,3,3-tetramethyldisiloxane (GAP) and 116.1 gram (0.387 mole) of octamethylcyclotetrasiloxane and 0.80 gram of tetramethylammonium hydroxide solution (20 weight % in methanol) heated at 75° C. for 12 hours while nitrogen was sparged into the reaction mixture. Volatilized methanol was collected in a side arm condenser. Reaction temperature was increased to 153° C. and maintained for 4 hours, cooled and filtered. There was obtained a polydimethylsiloxane having an average of 8.4 dimethylsiloxy units with terminal 3-amino-N-propyl groups "D8GAP" based on method of preparation and titration.

A mixture of 88.483 grams (0.170 moles) of BPADA, 42.92 grams (0.051 moles) of D8GAP, 14.538 grams (0.119 moles) of 2,4-toluenediamine and 360 ml of p-methylanisole was refluxed with stirring with azeotropic distillation of water for a period of 10 hours to a concentration of about 40% solids. The mixture was allowed to cool to room temperature and a portion of the homogenous reaction solution was precipitated into methanol. There was obtained a fibrous off-white solid which was dried in a vacuum at 88° C. overnight. Based on method of preparation and GPC analysis of twice-precipitated product, it was a silicone polyimide having a $\overline{M}_n$ of 23,000, and $\overline{M}_w$ of 85,000 grams/mole and an intrinsic viscosity of 0.44 dl/g in chloroform was obtained.

The above procedure was repeated except that the polymerization was effected in orthodichlorobenzene utilizing p-dimethylaminopyridine "DMAP" as a polymerization catalyst as follows:

A mixture of 40.890 grams (0.0786 mole) of BPADA, 20.886 grams (0.0239 mole) of $D_8GAP$, 6.588 grams (0.0546 mole) of TDA, 400 ml of o-dichlorobenzene "ODCB" and 100 mg (p-dimethylaminopyrridine) was stirred and refluxed for a period of 12 hours utilizing a nitrogen purge. The reaction mixture was heated at reflux for an additional 4 hours and cooled to room temperature. The resulting mixture was then diluted with chloroform and precipitated into methanol. The product was isolated and dried at 60° C. overnight in a vacuum oven. There was obtained, after precipitating the product twice from methanol, a silicone polyimide having an $\overline{M}_n$ of 39,000 g/mole, $\overline{M}_w$ of 87,000 g/mole, and an IV of 0.52 dl/g in chloroform.

The above results show that silicone polyimide made in accordance with the practice of the present invention, using methylanisole, is substantially equivalent to silicone polyimide made utilizing an imidization catalyst in a o-dichlorobenzene.

There was added 210 grams of 2,4-diaminotoluene dissolved in a mixture of 716 grams of diglyme and 144 grams of xylene to 1313 grams of BPADA and 2,865 grams of diglyme and 575 grams of xylene, which had been refluxed at 160° C. under a nitrogen blanket and allowed to cool to 125° C. The resulting mixture was heated to reflux at 158° C. and the water of reaction was collected in a trap. After 10 hours of gentle refluxing utilizing a nitrogen sweep, there was added over a period of 45 minutes, 0.807 moles of $D_8GAP$. Heating of the mixture was continued for an additional 8 hours and the mixture was then allowed to cool. There was obtained a silicone polyimide having an $\overline{M}_n$ of 8,000 g/mole and an $\overline{M}_w$ of 26,000 g/mole.

Three equivalent silicone polyimide solutions were prepared at 30 weight % concentration utilizing diglyme solvent, an orthodichlorobenzene solvent, and a p-methylanisole solvent. The silicone polyimide was a copolymer of BPADA, TDA (70 mole %), and $D_8GAP$ (30 mole %) prepared in o-dichlorobenzene utilizing aminopyridine as a condensation catalyst as shown above. The room temperature solution viscosity of the precipitated silicone polyimide in the various solvents are shown as follows:

|  | Viscosity (centipoise) |
| --- | --- |
| diglyme | 8000 |
| o-dichlorobenzene | 7500 |
| p-methylanisole | 3500 |

The above results show that the viscosity of the silicone polyimide provides a spin coating mixture which is superior to the viscosity provided by diglyme and o-dichlorobenzene.

EXAMPLE 2

Silicone polyimide copolymer was prepared in accordance with Example 1 utilizing p-methylanisole as the polymerization solvent utilizing BPADA, TDA, and $D_8GAP$ as the ingredients used in making the silicone polyimide copolymer. The same procedure was repeated except that the silicone polyimide copolymer was prepared in diglyme. The thermal stability of the silicone polyimides as films were compared using isothermogravimetric analysis at 350° C. It was found that the silicone polyimide prepared in p-methylanisole lost 1/10th the mass of the silicone polyimide prepared in a diglyme/xylene media.

Although the above examples are directed to only a few of the very many variables which can be utilized in making the silicone polyimide copolymers of the present invention, it should be understood that the present invention is directed to the use of a much broader variety of materials as set forth in the description preceding these examples.

What is claimed and sought to be protected by Letters Patent of the United States is as follows:

1. Silicone polyimide coating compositions comprising, by weight,
    (A) 100 parts of methylanisole, and
    (B) 2 to 150 parts of polyimidesiloxane selected from
        (1) the intercondensation product of reaction between substantially equal molar amounts of
            (i) aromatic bis(ether anhydride), and
            (ii) organic diamine selected from the class consisting of $C_{(6-14)}$ aryldiamine, aminoalkyl terminated polydiorganosiloxane and mixtures thereof, or
        (2) the intercondensation product of reaction between
            (iii) phthalic anhydride terminated polydiorganosiloxane, or a mixture of phthalic anhydride terminated polydiorganosiloxanedisiloxane and organic dianhydride and
            (iv) $C_{(6-14)}$ aryl diamine.

2. Silicone polyimide coating compositions comprising, by weight,
    (A) 100 parts of methylanisole, and
    (B) 2 to 150 parts of polyimidesiloxane selected from
        (1) the intercondensation product of reaction between substantially equal molar amounts of
            (i) 2,2-bis[4-(3,4-dicarboxyphenoxy)phenyl]propane dianhydride and
            (ii) organic diamine selected from the class consisting of toluenediamine, a polydimethylsiloxane having eight chemically combined organosiloxy units and terminal α-aminopropylsiloxy units and mixtures thereof, or
        (2) the intercondensation product of reaction between
            (iii) bis(phthalic anhydride) tetramethyldisiloxane, or a mixture of bis(phthalic anhydride)tetramethyl-disiloxane and organic dianhydride and
            (iv) organic diamine selected from the class consisting of oxydianiline, metaphenylenediamine, methylenedianiline, toluenediamine and mixtures thereof.

3. A coating composition in accordance with claim 2, where the polyimidesiloxane is the intercondensation product of reaction between 2,2-bis[4-(3,4-dicarboxyphenoxy)phenyl]propane dianhydride, and a mixture of toluenediamine and a polydimethylsiloxane having eight chemically combined dimethylsiloxy units and terminal α-aminopropylsiloxy units.

4. A coating composition in accordance with claim 2, where the polyimidesiloxane is the intercondensation product of reaction between bis(phthalic anhydride)tetramethyldisiloxane and oxydianiline.

5. A coating composition in accordance with claim 2, where the polyimidesiloxane is the intercondensation product of reaction between bis(phthalic anhydride)tetramethyldisiloxane, 2,2-bis[4-(3,4-dicarboxyphenoxy)-phenyl]propane dianhydride, and oxydianiline.

6. A coating composition in accordance with claim 2, where the polyimidesiloxane is the intercondensation product of reaction between bis(phthalic anhydride)tetramethyldisiloxane, 5,5'-(1,1,3,3-tetramethyl-1,3-disiloxane)bis-norbornane-2,3-dicarboxylic anhydride, and oxydianiline.

7. A method for making a silicone polyimide coating composition comprising effecting reaction between substantially equal molar amounts of aromatic bis(ether-anhydride) and organic diamine selected from the class consisting of $C_{(6-14)}$ aryldiamine, aminoalkyl terminated polydiorganosiloxane and mixtures thereof, in the presence of methylanisole.

8. A method for making a silicone polyimide coating composition which comprises effecting reaction between substantially equal molar amounts of phthalicanhydride terminated polydiorganosiloxane, or a mixture of phthalicanhydride terminated polydiorganosiloxane and organic dianhydride and $C_{(6-14)}$ aryldiamine, in the presence of methylanisole.

9. A method for making silicone polyimide coating compositions comprising effecting reaction between substantially equal molar amounts of 2,2-bis[4-(3,4-dicarboxyphenoxy)phenyl]propane dianhydride and organic diamines selected from the class consisting of toluene diamine, a polydimethylsiloxane having a chemically combined organosiloxy units and terminal α-aminopropylsiloxy units and mixtures thereof, in the presence of methylanisole.

10. A method for making silicone polyimide coating compositions comprising effecting reaction between substantially equal molar amounts of bis(phthalicanhydride)tetramethyldisiloxane, or a mixture of bis(phthalicanhydride)tetramethyldisiloxane and organic dianhydride and organic diamine selected from the class consisting of oxydianiline, metaphenylenediamine, methylenedianiline, toluenediamine, and mixtures thereof, in the presence of methylanisole.

* * * * *